(12) United States Patent
Westcott

(10) Patent No.: US 7,348,689 B2
(45) Date of Patent: Mar. 25, 2008

(54) SWITCHING CIRCUIT AND A METHOD OF OPERATION THEREOF

(75) Inventor: Andrew M G Westcott, Great Baddow (GB)

(73) Assignee: BAE Systems PLC, London (GB)

( * ) Notice: Subject to any disclaimer, the term of this patent is extended or adjusted under 35 U.S.C. 154(b) by 114 days.

(21) Appl. No.: 10/500,638

(22) PCT Filed: Dec. 17, 2002

(86) PCT No.: PCT/GB02/05734

§ 371 (c)(1), (2), (4) Date: Jul. 2, 2004

(87) PCT Pub. No.: WO03/061123

PCT Pub. Date: Jul. 24, 2003

(65) Prior Publication Data

US 2005/0063204 A1    Mar. 24, 2005

(30) Foreign Application Priority Data

Jan. 2, 2002    (GB)    .................................. 0200030.5

(51) Int. Cl.
*H01H 47/00*    (2006.01)
(52) U.S. Cl. ........................ 307/130; 307/138; 318/800
(58) Field of Classification Search ................ 307/130, 307/138; 318/800
See application file for complete search history.

(56) References Cited

U.S. PATENT DOCUMENTS

| | | | |
|---|---|---|---|
| 4,585,986 A | 4/1986 | Dyer | .......................... 323/271 |
| 4,768,141 A | 8/1988 | Hubertus et al. | ............. 363/16 |
| 4,890,188 A | 12/1989 | Russell et al. | .............. 361/154 |
| 5,559,467 A | 9/1996 | Smedley | ....................... 330/10 |
| 5,729,422 A | 3/1998 | Henke | ......................... 361/156 |

(Continued)

FOREIGN PATENT DOCUMENTS

DE    36 38 174 A1    5/1988

(Continued)

OTHER PUBLICATIONS

Patent Abstract of Japan, vol. 018, No. 343, Jun. 28, 1994 & JP 06 083402 A, Mar. 25, 1994.

(Continued)

*Primary Examiner*—Michael Sherry
*Assistant Examiner*—Hal I Kaplan
(74) *Attorney, Agent, or Firm*—Nixon & Vanderhye P.C.

(57) ABSTRACT

This invention relates to the operation of a switching circuit, such as a bridge circuit. The invention provides a method of generating pulsed first and second switching signals for switching first and second switches of a switching circuit further comprising an output and that receives a DC signal of voltage +Vs, wherein switching of the first and second switches produces voltage pulses of +Vs, 0V and −Vs at the output; the method comprising the steps of: receiving a voltage demand signal; and generating the first and second switching signals according to a rule that the first switching signal shall have a single pulse of a first determined width and the second switching signal shall remain in one state, the combination of the first and second switching signals producing an average voltage at the output being substantially equal to the demanded voltage.

23 Claims, 6 Drawing Sheets

U.S. PATENT DOCUMENTS

| | | | |
|---|---|---|---|
| 5,847,554 A | 12/1998 | Wilcox et al. | 323/282 |
| 5,977,725 A | 11/1999 | Miyazaki et al. | 315/291 |
| 6,194,883 B1 | 2/2001 | Shimamori | 323/283 |
| 6,213,442 B1 | 4/2001 | Ivers et al. | 248/550 |
| 6,316,895 B1 | 11/2001 | Ramarathnam | 318/439 |
| 6,504,698 B1 | 1/2003 | Durif et al. | 361/152 |
| 6,518,711 B2 * | 2/2003 | Chao | 315/209 R |
| 6,661,636 B2 * | 12/2003 | Koch | 361/154 |
| 2005/0083115 A1 * | 4/2005 | Risbo | 330/10 |

FOREIGN PATENT DOCUMENTS

| | | |
|---|---|---|
| DE | 40 18 930 A1 | 1/1992 |
| DE | 197 28 318 C1 | 4/1999 |
| DE | 197 47 033 A1 | 4/1999 |
| EP | 0 150 492 | 12/1984 |
| EP | 0 443 032 | 8/1991 |
| EP | 0 760 552 A | 3/1997 |
| EP | 1 146 217 | 10/2001 |
| GB | 2 014 388 | 8/1979 |
| GB | 2 084 827 | 4/1982 |
| GB | 2 184 625 | 6/1987 |
| GB | 2 211 680 | 7/1989 |
| JP | 1-109707 | 4/1989 |
| JP | 1-247507 | 10/1989 |
| JP | 7-103324 | 4/1995 |
| JP | 09-261967 | 10/1997 |
| JP | 10-96480 | 4/1998 |
| JP | 10-149888 | 6/1998 |
| JP | 2000-006523 | 1/2000 |
| JP | 2001-258160 | 9/2001 |
| WO | WO 93/07637 | 4/1993 |
| WO | 98/39787 A | 9/1998 |
| WO | 00/74222 A | 12/2000 |
| WO | WO 01/20140 | 3/2001 |
| WO | WO 01/52294 | 7/2001 |

OTHER PUBLICATIONS

I. Toru, Patent Abstracts of Japan, vol. 2000, No. 24, May 2001, (JP 2001-182593).

M. Tetsuro, Patent Abstracts of Japan, vol. 2000, No. 25, Apr. 2001, (JP 2001-217122).

M. Miyokazu, Patent Abstracts of Japan, vol. 1999, No. 8, Jun. 1999, (JP 11-069629).

* cited by examiner

SWITCHING CIRCUIT AND A METHOD OF OPERATION THEREOF

This application is the US national phase of international application PCT/GB02/05734 filed in English on 17 Dec. 2002, which designated the US. PCT/GB02/05734 claims priority to GB Application No. 0200030.5 filed 02 Jan. 2002. The entire contents of these applications are incorporated herein by reference.

BACKGROUND OF THE INVENTION

1. Field of the Invention

This invention relates to the operation of a switching circuit comprising first and second switches that are switched by pulsed first and second switching signals.

The switching circuit may comprise a bridge circuit operated to produce a voltage across a load connected to an output of the bridge circuit in accordance with a required voltage. For example, a presently contemplated application of the present invention is in driving an electromagnet in response to a demanded force to be provided by the electromagnet that must be met to a very high tolerance. The force produced by the electromagnet can be controlled in response to either current demands or voltage demands, because control of either current or voltage affects the force produced by the electromagnet. In addition, the current controller can be operated in response to force demands, although this must be converted into a current or voltage demand. Even where the current controller is operated in voltage demand mode with demanded voltages being set across the electromagnet, this will of course influence the current flowing through the electromagnet and so the term 'current controller' is used to cover operation in response to voltage or current or field demands.

Where the current controller is operated in response to voltage demands, high-frequency voltage pulses may be applied to the electromagnet because the large inductance associated with an electromagnet leads to a slow response time in the current so that it smoothly follows drifts in the average voltage applied across the electromagnet.

2. Discussion of Prior Art

A known switching circuit is shown in FIG. 1. As can be seen, the switching circuit comprises a half-bridge circuit with an electromagnet connected across its output. Control of the voltage across the electromagnet is achieved by switching a pair of transistors positioned on opposed arms of the bridge circuit (the other opposed arms containing diodes to complete the half-bridge circuit) to alter the polarity of the voltage across the electromagnet between $+V_S$ and $-V_S$. A current or voltage demand for a period will be received periodically and switching signals generated to match this demand. The switching signals are supplied at the points marked A and B to control the transistors such that they are switched between maximum and minimum conducting states (their linear region is not used due to poor power efficiency). The diodes in the half-bridge circuit ensure that current flows in one direction only through the electromagnet, in this case from right to left in FIG. 1. The current controller is operated such that the transistors are switched concurrently: when both transistors are on (i.e. conducting), a voltage of $+V_S$ is applied across the electromagnet and when the transistors are off (i.e. non-conducting), a voltage of $-V_S$ is applied across the electromagnet. The duty cycles at $+V_S$ and $-V_S$ within each period determine the average current delivered to the electromagnet in that period, remembering that the inductance of the electromagnet ensures that the current smoothly follows the voltage rather than sharply jumping with each voltage pulse. Hence, by switching the transistors at appropriate times, the desired current can be delivered to the electromagnet. A reservoir capacitor is included to hold current drawn from the electromagnet that cannot be passed back to the DC supply.

The pulsed voltage signal that produces these duty cycles is implemented using pulsed switching signals supplied to the transistors. The switching signals are modulated according to a pulse width modulation scheme according to an analogue-implemented scheme, such that the width of the pulses within a period are varied so that the pulse at $+V_S$ is varied relative to the remaining time at $-V_S$ to produce the desired current. Alternatively, a pulse density modulation scheme may be used, as is well known in the art.

A problem with the above switching circuit is that its performance is limited by the distortion in the leading and trailing edges of the switching pulses provided to switch the transistors. This is particularly severe for short pulses where there is little time for the waveform to settle between the leading and trailing edges of the pulse. Furthermore, each switching event inevitably causes a power loss in the circuit. In the case of the above example where transistors are used in a half-bridge circuit, the power loss associated with switching the transistors dominates over all other power losses. Accordingly, the performance of the switching circuit is degraded in response to both of these problems. As will be appreciated, these problems are not limited to the switching circuit described above but are general across a broad spectrum of switching circuits employing slow or power-demanding switches.

Moreover, these problems are often exacerbated by repeated switching. For example, pulse density modulation is a commonly used modulation scheme but is problematic in that the transistors must be switched on and off many times to achieve the required voltage using density modulation of fixed-width pulses.

SUMMARY OF THE INVENTION

According to a first aspect, the invention resides in a method of generating pulsed first and second switching signals for switching first and second switches of a switching circuit further comprising an output and that receives a DC signal of voltage $+V_S$, wherein switching between various combinations of on and off states of the first and second switches produces a voltage at the output with pulses at levels of $+V_S$, 0V and $-V_S$; the method comprising the steps of: (a) receiving a voltage demand signal indicative of a desired voltage to be supplied at the output in a period; and (b) generating the first and second switching signals according to a rule that the first switching signal shall have a single pulse of a first determined width within the period and the second switching signal shall remain in one state throughout the period, the first determined width being such that the combination of the first and second switching signals when applied to the first and second switches respectively produce an average voltage at the output for the period being substantially equal to the desired voltage.

Using this method of leaving the second switching signal in one state throughout the period is advantageous because only one transistor is switched in a period rather than both. This is convenient in reducing power losses in the bridge circuit and in avoiding switching delays. Moreover, inaccuracies that are present upon switching in a pulsed scheme, e.g. ringing seen in the otherwise flat tops of the pulses and slow response times leading to sloping rather than vertical leading and trailing edges of the pulses, are alleviated.

The above switching scheme will lead to a period having pulses of solely $+V_S$ or solely $-V_S$ relative to the 0V baseline. As will be appreciated, if a number of positive average voltages are required over consecutive periods, one switch can be left in one state throughout all these periods (the on state, the other switch being switched on and off to give voltages of $+V_S$ and 0V). Similarly, for negative voltages, one switch can be left in an off state and the other switch is switched between on and off states to give voltages of 0V and $-V_S$. It is only where the average voltage crosses through zero that both first and second switches will need to be switched (with one switch needing to be switched at the very start of the next period). This leads to significant reductions in power losses in the bridge circuit.

Using pulsed switching signals is advantageous as it allows an all-digital implementation and, moreover, it means that the voltage supplied to the output is also pulsed, although there will be pulses of $+V_S$ and $-V_S$ relative to the 0V baseline.

Essentially, the method comprises the step of generating the first and second switching signals according to a pulse width modulation (PWM) scheme. Modulating the switching sequences to a PWM scheme means that the pulsed voltages supplied to the output are also modulated to a PWM scheme. This is because the voltage supplied to the output steps each time there is a pulse edge in either of the switching signals, hence the edge positions of the switching signals determine the edge positions of the voltage pulses supplied to the output. The switching signals may have a digital modulation (i.e. to two levels with high and low values corresponding to the switches being on/conducting or off/non-conducting), but the combination of on and off switch states results in the three levels ($+V_S$, 0V and $-V_S$) of the bipolar PWM voltages supplied to the output.

The voltage supplied to the output depends on the states of the first and second switches as follows. When both switches are on, the output sees a voltage of $+V_S$. When both switches are off, the output sees a voltage of $-V_S$. Finally, when one switch is on and the other is off, irrespective of which way round, the output sees a voltage of 0V.

As will be appreciated, using pulses at levels of $+V_S$, 0V and $-V_S$ allows an average voltage within the range of $+V_S$ and $-V_S$ to be produced for that period. For example, if a voltage of $0.5V_S$ is desired, then a voltage of $+V_S$ can be supplied to the output for half of the period and a voltage of 0V for the other half.

Using bipolar switching, i.e. switching between three voltage levels $+V_S$, 0V and $-V_S$, gives advantages over using unipolar switching, i.e. switching between $+V_S$ and $-V_S$ only. For example, an additional one bit of resolution is acquired using bipolar switching for a given timing clock frequency as voltage drops of $V_S$ are possible rather than just the voltage drops of $2V_S$ obtained with unipolar switching. Alternatively, the same resolution can be obtained using only half the timing clock frequency.

Use of bipolar switching according to the above method introduces 'cross-over distortion'. This occurs when a signal of average voltage close to 0V is required. In this case, the required widths of the voltage pulses supplied to the output and hence the pulses of the switching signals tend to zero. Producing very narrow pulses is very difficult due to the slow rise and fall times of the pulse edges and due to ringing. The rising edge followed by the ringing top whilst the voltage settles to its final value will be of a substantially fixed width and, similarly, the falling edge will also be of a substantially fixed width. In wider pulses, these effects are mitigated by the relatively long period at steady voltage. Conversely, where the pulse width is so narrow that there is no time to settle to a steady voltage, control of the average voltage seen by the output is severely limited. Hence, at low voltage demands where very narrow pulses are required, the level of distortion is greatly enhanced and this is known as 'cross-over distortion'.

Optionally, the method may comprise the step of generating the first and second switching signals according to a rule that the pulse width of the resulting voltage at the output must not fall below a minimum pulse width. Conveniently, this alleviates the enhanced distortion described above. By pulse widths, it should be remembered that these are the widths of the pulses at $+V_S$ and $-V_S$ relative to the 0V baseline.

Conveniently, pulse widths below the minimum pulse width are avoided by departing from the rule that the second switching signal shall remain in one state throughout a period in favour of generating the first and second switching signals according to a rule that the second switching signal shall have a single pulse of a second determined width within the period to create a voltage pulse at the output of either $+V_S$ or $-V_S$.

Operating the primary rule that one switch remains in one state throughout a period and only the other is switched produces pulses of $+V_S$ and 0V or $-V_S$ and 0V only. The secondary rule of switching both first and second switches during a period, although not concurrently, is advantageous when small voltages are required because it generates voltages of $+V_S$ and $-V_S$ relative to a 0V baseline. In this way, a small average positive voltage or small average negative voltage can be generated from a combination of wider $+V_S$ and $-V_S$ pulses that, in turn, can be generated from wider pulses of the first and second switching signals. This increase in control of the average voltage supplied to the output outweighs the disadvantage of introducing further switching within each period.

Optionally, the method may comprise the step of adding the second determined width to the first determined width such that the voltage pulse at the output of $+V_S$ or $-V_S$ resulting from the pulse in the second switching signal is balanced by an equal width of voltage pulse at the output of $-V_S$ or $+V_S$ respectively resulting from the increased first determined width of the first switching signal. Accordingly, there is no net increase or decrease in the average voltage supplied to the output during the period.

Preferably, the method may comprise the step of generating the first and second switching signals according to a rule that the leading and trailing edges of the first switching signal do not coincide with either the leading or trailing edge of the second switching signal.

Following this method, the first and second switches are not switched concurrently. Operating only one switch at a time is advantageous because the voltage drops that occur at the output may be halved at each switching event. This is particularly advantageous where the voltage drop of $2V_S$ is large enough to cause insulation breakdown of any components of the bridge circuit or any connected load. Conversely, adopting bipolar switching allows the bridge circuit to be run from a higher voltage DC source without fear of insulation breakdown upon switching. Furthermore, the power of the unwanted components in the output waveform at harmonics of the pulse repetition frequency is reduced from a fixed high level to a lower level which drops as the signal drops.

The method may comprise the step of generating the first and second switching signals according to a rule that any pulse should be positioned symmetrically about the centre of the period. This is so-called uniform PWM and leads to a voltage being supplied to the output that is also symmetric about the centre of the period. Other forms of PWM are possible, such as leading edge or trailing edge PWM.

Preferably, the method may comprise the step of generating the first and second switching signals according to the rule that where pulses cannot be centred symmetrically, the longer and shorter sides of the asymmetric pulses are alternated between the leading edge side and the trailing edge side for successive asymmetric pulses. For example, where a period extends over an even number of timing clock cycles, a pulse occupying an odd number of clock cycles cannot be created symmetrically within the period: one clock cycle must be added either to the leading edge or to the trailing edge of the otherwise symmetric pulse. By performing the method herein defined, noise is suppressed that would otherwise result from always adding weight to the leading edge or always to the trailing edge.

Optionally, the method may further comprise the step of noise shaping the first and second switching signals. Advantageously, this noise shaping may be second-order noise shaping, i.e. noise shaping that compensates for the quantisation error in the previous two periods.

The invention also resides in a method of operating a switching circuit comprising a bridge circuit having an input that receives a DC signal of voltage $+V_S$, an output and first and second arms having first and second switches respectively, the first and second arms being connected to opposed ends of the output, the method comprising the steps of: (a) generating pulsed first and second switching signals according to the first aspect of the invention; and (b) supplying the first and second switching signals to the first and second switches respectively thereby to cause the first and second switches to switch between on and off states, switching between various combinations of on and off states producing an electrical signal across the output with voltage pulses at levels of $+V_S$, 0V and $-V_S$ and with an average voltage for the period substantially equal to the desired voltage.

Optionally, either the first or second determined pulse width is generated with reference to a voltage signal indicative of the DC signal such that the determined pulse width compensates for fluctuations in the DC supply. Voltage fluctuations in the DC supply will manifest themselves as pulse amplitude modulation in the voltage supplied to the output and so the desired voltage will not be met by the average voltage supplied to the output over the period. By adding or subtracting width to/from the pulse or pulses of the first and/or second switching signal, the lost or gained amplitude can be compensated for by adjusting the width of the voltage pulse or pulses supplied to the output.

Advantageously, the voltage signal is passed through a filter to obtain a predictive measure of fluctuations in the DC supply. This may alleviate problems in the finite response time in relaying the voltage signal and in generating the switching signals for the successive period. The voltage signal may be passed through a finite impulse response filter.

The first or second determined pulse width may be generated to include additional width to compensate for a voltage drop across a diode and/or transistor in the bridge circuit. Conveniently, the additional width is calculated with reference to a current signal indicative of the current flowing through the output and a representative resistance of the diode or transistor. If these voltage drops are not compensated for, the voltage supplied to the output will be less than the desired voltage.

Optionally, the width of a pulse of the first or second switching signals is generated to include additional width to compensate for a voltage offset caused by slow response times in the first or second switch. Slowness in the response of the switches will lead to sloping leading and trailing edges of the pulses seen in the voltage supplied to the output. If the slope is not equal, the average voltage supplied to the output over the period will not match the desired voltage.

Preferably, the first and second switches are transistors and the method comprises the step of switching the transistors between on and off states corresponding to substantially maximum and substantially minimum current flow respectively through the transistors. The transistors may be MOSFET transistors, for example.

Optionally, the method comprises the step of receiving a current demand signal indicative of a desired current to be supplied to the output in a period and calculating the voltage demand signal indicative of a desired voltage to be supplied to the output that results in an electrical signal being supplied to the output during the period with a current substantially equal to the desired current. In this way, the current controller may take a current demand and operate by calculating a corresponding voltage demand locally.

Optionally, the step of calculating the voltage demand signal is performed with reference to a model of the load characteristic of a load connected to the output. For example, a look-up table may be constructed listing required voltages to generate the desired currents. Alternatively, a polynomial relationship or similar may be derived such that the required voltage can be calculated given a desired current.

Preferably, the step of generating the voltage demand signal may be performed with reference to a current signal indicative of the current flowing through the output. In this way, adjustments may be made to compensate for any difference between the desired current and the actual current measured at the output. One way of achieving this is to calculate the difference between tube desired current and actual measured current and subtract this from the current demand signal prior to calculating the voltage demand.

The invention also resides in a computer program comprising program code for performing the method steps described herein above when the program is run on a computer and/or other processing associated with the bridge circuit. Furthermore, the invention also resides in a computer program product comprising program code stored on a computer readable medium for performing the method steps described herein above when the program is run on a computer and/or other processing associated with the bridge circuit.

From another aspect, the invention also resides in a switching circuit operable to receive a DC signal of voltage $+V_S$ and that comprises first and second switches, an output and processor programmed to perform the method steps described herein above. Optionally, the switching circuit may further comprise a noise shaper operable to noise shape the first and second switching signals. The invention also resides in a bridge circuit comprising an input operable to receive a DC signal of voltage $+V_S$, an output and first and second arms having first and second switches respectively, the first and second arms being connected to opposed ends of the output and processor programmed to perform the method steps described herein above. The bridge circuit may optionally include any of a voltage signal sensor, a filter (including a finite impulse response filter), a diode and/or transistor or a current signal sensor.

BRIEF DESCRIPTION OF THE DRAWINGS

The invention will now be described, by way of example only, by reference to the accompanying drawings in which:

FIG. 3b is a schematic representation of the noise shaper 46 of FIG. 3a;

DETAILED DISCUSSION OF EMBODIMENTS

Figure 2:
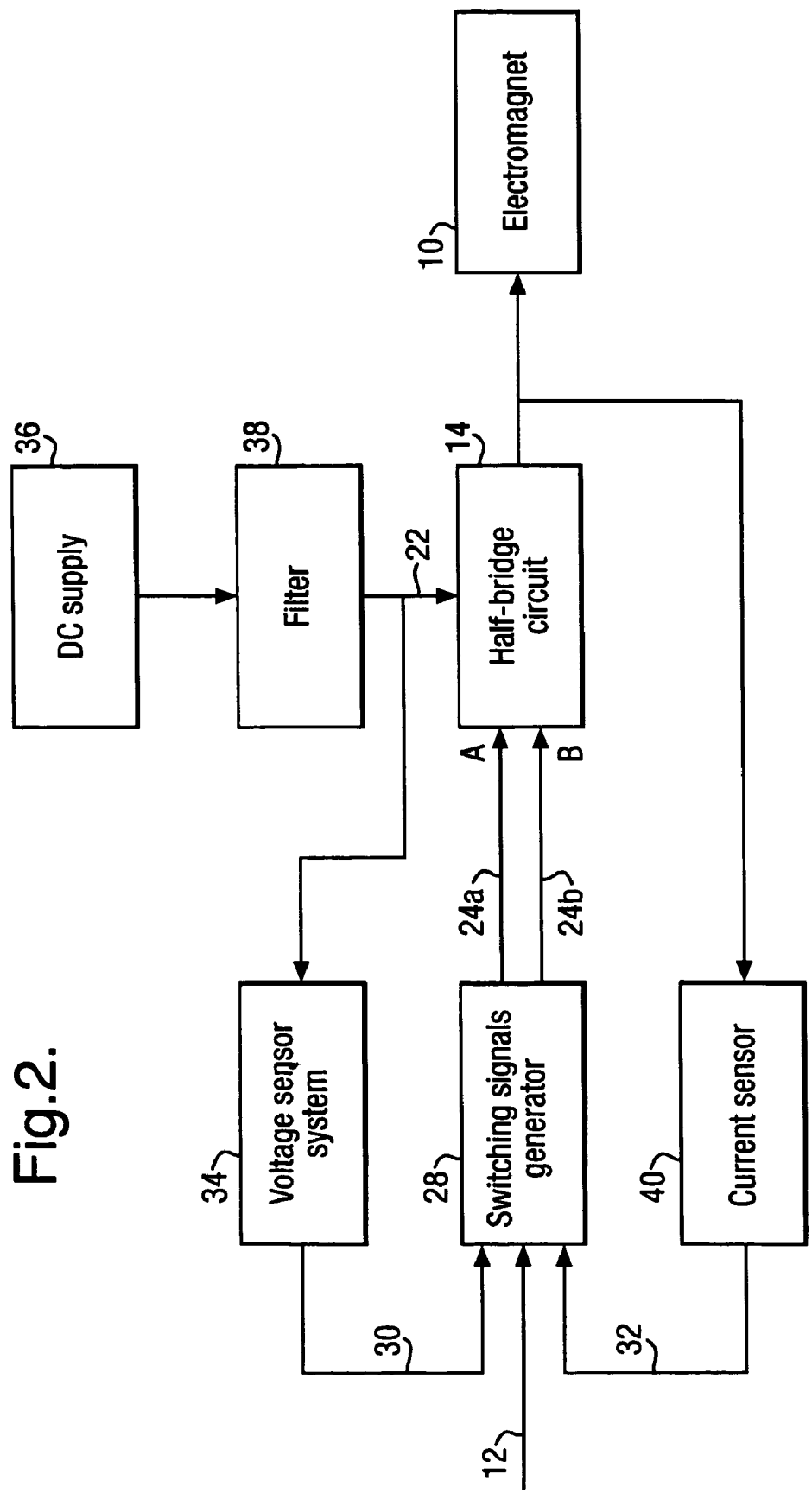
FIG. 2 is a schematic representation of a current controller according to a first embodiment of the present invention.

A current controller that may be operated in accordance with the method of the invention is illustrated in the schematic sketch of FIG. 2. As will be clear, the current controller supplies current to an electromagnet 10. The electromagnet 10 may, for example, be one of an array of such electromagnets used to levitate a raft supporting moving machinery that is subject to resonant vibrations thereby isolating the resonances from any surrounding structure.

In this embodiment, the current controller supplies current to the electromagnet 10 in response to a voltage demand signal 12. The voltage demand signal 12 is generated in accordance with a desired force to be generated by the electromagnet 10. For example, the voltage demand signal 12 may be generated by a global controller (not shown) that gathers information about the vibrations of the raft supporting the moving machinery from a number of motion sensors over successive periods of time. The global controller may then determine the force that should be generated by each electromagnet 10 to reduce the resonances during each successive period. Once the force is determined, the global controller may calculate the required voltage to be applied to the electromagnet 10 for each successive period to realise the desired force and supply this to the current controller as the voltage demand signal 12. Alternatively, the global controller could supply a signal indicative of the desired force to the current controller, with the current controller calculating the corresponding voltage demand signal 12 locally.

Figure 1:
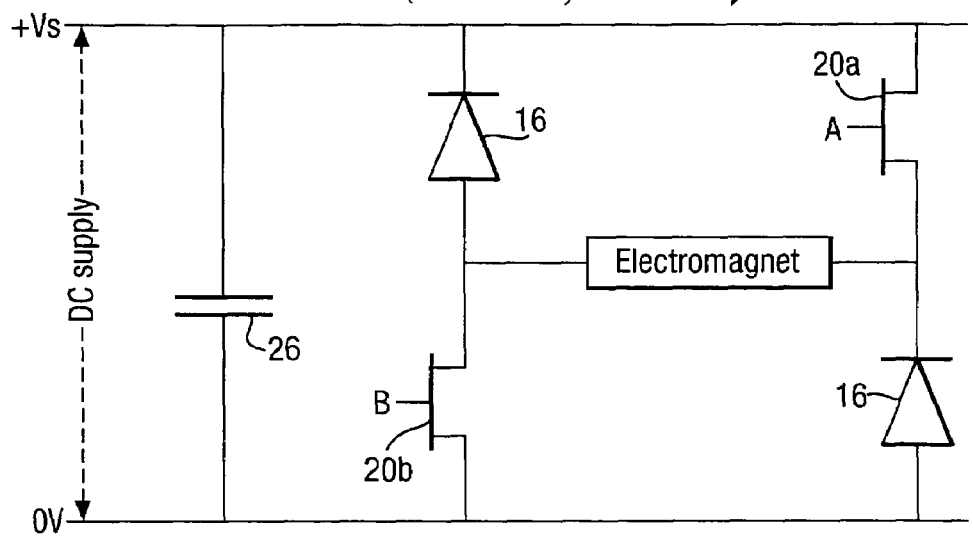
FIG. 1 shows a half-bridge circuit 14.

The current supplied to the electromagnet 10 is regulated by a switching circuit in the form of a half-bridge circuit 14 that corresponds to the one shown in FIG. 1. The half-bridge circuit 14 comprises a bridge whose opposed arms have a pair of diodes 16 and a pair of transistors 20a, 20b. The supply input to the half-bridge circuit 14 is supplied with a DC voltage of $+V_S$, obtained as a filtered DC supply 22 as will be described in more detail later. The electromagnet 10 is connected across the output of the half-bridge circuit 14.

Switching signals 24a, 24b are applied to the transistors 20a, 20b at points A, B respectively. The transistors may be of the MOSFET type, although other commonly available types are equally employable. The transistors 20a, 20b are run between on and off states, i.e. between states of minimum and maximum current flow, rather than using the linear region of their conductance where power losses are greater. The switching signals 24a, 24b control the transistors 20a, 20b respectively to operate the half-bridge circuit 14 in one of three modes.

In the first mode, both transistors 20a, 20b are switched 'on', i.e. into a conducting state, so that the electromagnet 10 sees a voltage of $+V_S$ and current flows through the electromagnet 10 in a forward path from transistor 20a to transistor 20b, i.e. from right to left.

In the second mode, one of the transistors 20a, 20b is switched 'on' and the other is switched 'off', i.e. into a non-conducting state. As will be readily apparent, in this mode the electromagnet 10 sees a voltage of 0V and current can only flow through one loop of the half-bridge circuit 14. When transistor 20a is switched on and transistor 20b is switched off, current flows in the upper loop of the half-bridge circuit 14 shown in FIG. 1. Conversely, when transistor 20b is switched on and transistor 20a is switched off, current flows through the lower loop of the half-bridge circuit 14 of FIG. 1. However, irrespective of which transistor 20a, 20b is on and which is off, current always flows through the electromagnet 10 from right to left: this current will drop in magnitude according to the resistive losses in the current path.

Finally, in the third mode both transistors 20a, 20b are switched off. The reservoir capacitor 26 connected across the filtered DC supply 22 and the large inductance of the electromagnet 10 ensures current flows through the electromagnet 10 along a reverse path through both diodes 16. Accordingly, the electromagnet 10 sees a voltage of $-V_S$ and, again, current flows through the electromagnet 10 from right to left. This current flow will diminish in magnitude as the reservoir capacitor 26 discharges through resistive losses.

It will be appreciated that the above arrangement leads to unidirectional current flow through the electromagnet 10. Furthermore, it will be evident that this current flow may be controlled by supplying suitable switching signals 24a, 24b to transistors 20a, 20b respectively thereby to set voltages of $+V_S$, 0V or $-V_S$ across the electromagnet 10.

The switching signals 24a, 24b for each successive period of time are generated by a switching signals generator system 28 operable in response to the voltage demand signal 12. The average current flowing through the electromagnet 10 during any one period may be varied by altering the duty cycles at each of the voltage levels $+V_S$, 0V or $-V_S$ during the period. A maximum increase in current flow will correspond to a voltage of $+V_S$ being set throughout a period and a maximum decrease in current flow will correspond to a voltage of $-V_S$ being set throughout a period.

In addition to generating the switching signals 24a, 24b in response to the voltage demand signal 12, the switching signals generator system 28 may also take account of two further signals when generating the appropriate switching signals 24a, 24b. These signals are a voltage sensor signal 30 and a current sensor signal 32. The voltage sensor signal 30 is a predictive measure of voltage fluctuations in the filtered DC supply 22 provided at the input of the half-bridge circuit 14. The voltage sensor signal 30 is generated by a voltage sensor system 34 that measures fluctuations in the voltage supplied by a DC supply 36 after it has passed through a filter 38 as will be described in more detail below. Turning now to the current sensor signal 32, this signal 32 is generated by a current sensor 40 that measures the current produced by the half-bridge circuit 14 that flows through the electromagnet 10 as will be described in more detail below. Essentially, the current sensor signal 32 is used by the switching signals generator system 28 to account for voltage drops in the transistors 20a, 20b and slow rise and fall times in the voltage pulses seen by the electromagnet 10 due to its capacitance.

Although it is not essential for the switching signals generator system 28 to generate the switching signals 24a, 24b with regard to the voltage sensor signal 30 or the current sensor signal 32, far better noise control can be achieved if it is as will become evident below.

The elements of the switching signals generator system 28 will now be described in more detail. As can be seen most clearly from FIG. 3a, the voltage demand signal 12, the voltage sensor signal 30 and the current sensor signal 32 are passed to a voltage pulse width generator 42. The voltage pulse width generator 42 calculates the required voltage pulse width 44 for the period to match the voltage demand signal 12 for that period, compensating for any predicted voltage fluctuations in the filtered DC supply 22 by reference to the voltage sensor signal 30 and for any voltage drops in the half-bridge circuit 14 by reference to the current sensor signal 32. For example, if the voltage demand signal 12 demands a voltage of $½V_S$ for the period, the voltage pulse width generator 42 will generate a pulse of $+V_S$ to occupy half the period, the other half of the period being set to 0V.

The calculated voltage pulse width 44 is then passed to a noise shaper 46 where quantisation noise in the signal is shaped such that noise is suppressed at the frequencies of interest at the expense of increased noise at higher frequencies. The noise shaper 46 is shown in more detail in FIG. 3b and will be discussed in greater detail below.

After noise shaping, the resulting voltage pulse width 48 is then passed to a switching signals pulse width generator 50 that calculates the pulse widths for each of the switching signals 24a, 24b passed to the transistors 20a, 20b. These switching signal pulse widths 52 are set to correspond to the noise shaped voltage pulse width 48 passed on by the noise shaper 46. The switching signal pulse widths 52 are calculated with respect to the current sensor signal 32 (carried through from the voltage pulse width generator 42 and the noise shaper 46) to compensate for slow rise and fall times in the voltage across the electromagnet 10 following switching of the transistors 20a, 20b. In addition, the switching signal pulse widths 52 are combined to give the compensated voltage pulse width 53.

Now that the switching signals' pulse widths 52 are known, they are passed on to a pulse width quantiser 54 to have the required width matched to the nearest available quantised level within the bit resolution of the quantising scheme. The quantised switching signals pulse widths 56 are used to calculate the corresponding quantised voltage pulse width 57, which will differ from the compensated voltage pulse width 53 within the limits of quantisation. The differences between the switching signals pulse widths 52 and the quantised switching signals pulse widths 56 and the compensated voltage pulse width 53 and the quantised voltage pulse width 57 are, of course, quantisation errors and they manifest themselves as quantisation noise. The quantised voltage pulse width 57 is sent back through a feedback loop 58 to the noise shaper 46 such that the quantisation noise is reduced.

The quantised switching signals pulse widths 56 are then passed to a switching signals edge position generator 60 that calculates the appropriate edge positions for the switching signals 24a, 24b. The calculated switching signals edge positions 62 are then converted to the actual switching signals 24a, 24b by a switching signals generator 64 with reference to a precision timing clock 66 thereby ensuring accuracy and synchronisation. Finally, the switching signals 24a, 24b are passed to the transistors 20a, 20b respectively at points A and B of FIG. 1 respectively. Operation of the transistors 20a, 20b causes the voltage across the electromagnet 10 to vary between the values of $+V_S$, 0V and $-V_S$ thereby forming quantised voltage pulses to match the quantised voltage pulse width 57.

Figure 3A:
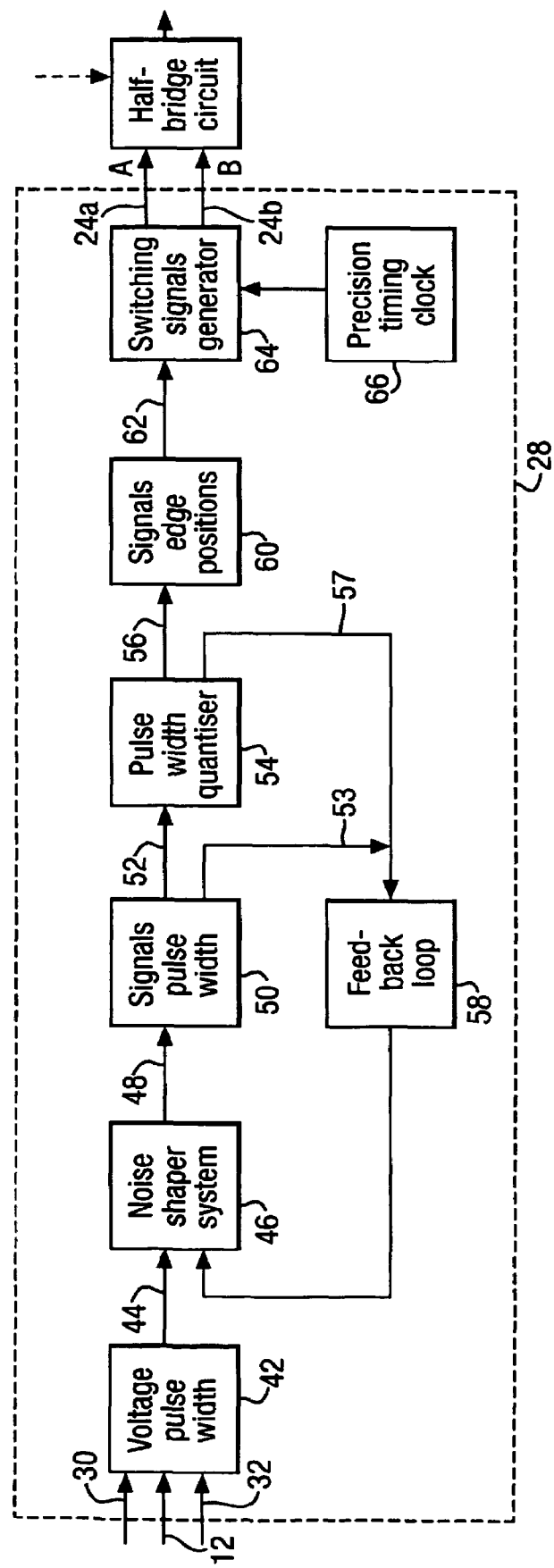
FIG. 3a is a schematic representation of the switching signal generator 28 of FIG. 2.
Figure 3B:
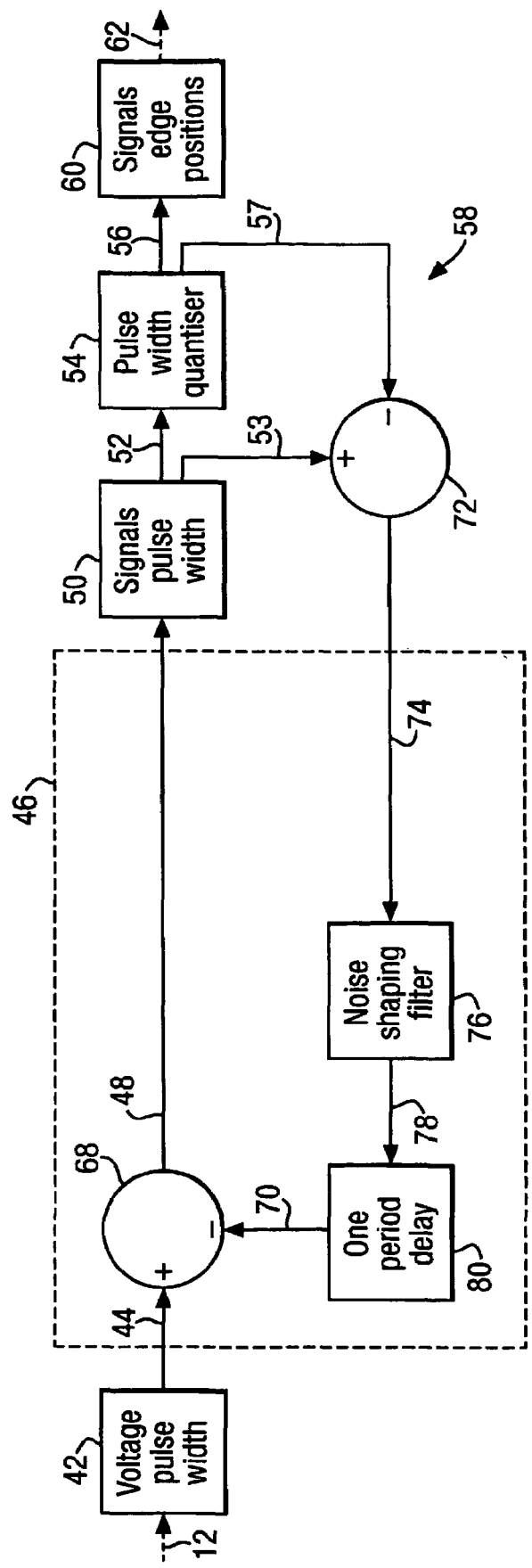

The noise shaper 46 of FIG. 3a is shown in more detail in FIG. 3b. As can be seen, the voltage pulse width 44 is passed to a junction 68 where the noise-shaped quantisation error 70 is subtracted. In actual fact, a second-order noise-shaping scheme is used where a weighted fraction of the noise-shaped quantisation error from the last-but-one period is combined with the noise-shaped quantisation error 70 from the previous period before being subtracted. This produces a noise-shaped voltage pulse width 48 that contains a compensation for the additional voltage added or missed due to the quantisation error of the previous periods. The noise-shaped voltage pulse width 48 is then used for generating the switching signals pulse widths 52 that are used in turn to generate the quantised switching signals pulse widths 56 from which the quantised voltage pulse width 57 is deduced as described above.

The quantised voltage pulse width 57 is passed along the feedback loop 58 where it is subtracted from the compensated voltage pulse width 53 at the junction 72 to give the quantisation error 74. Following that, the quantisation error 74 is processed by a noise shaping filter 76 that uses second-order noise-shaping to suppress the quantisation noise across the frequency band of interest, as is well known in the art.

Next, the processed quantisation error 78 produced by the noise shaping filter 76 is passed through a one period delay at 80 to ensure that the processed quantisation error is subtracted from the voltage pulse width 44 for the successive period. Hence, the negative feedback loop is completed.

Figure 4:
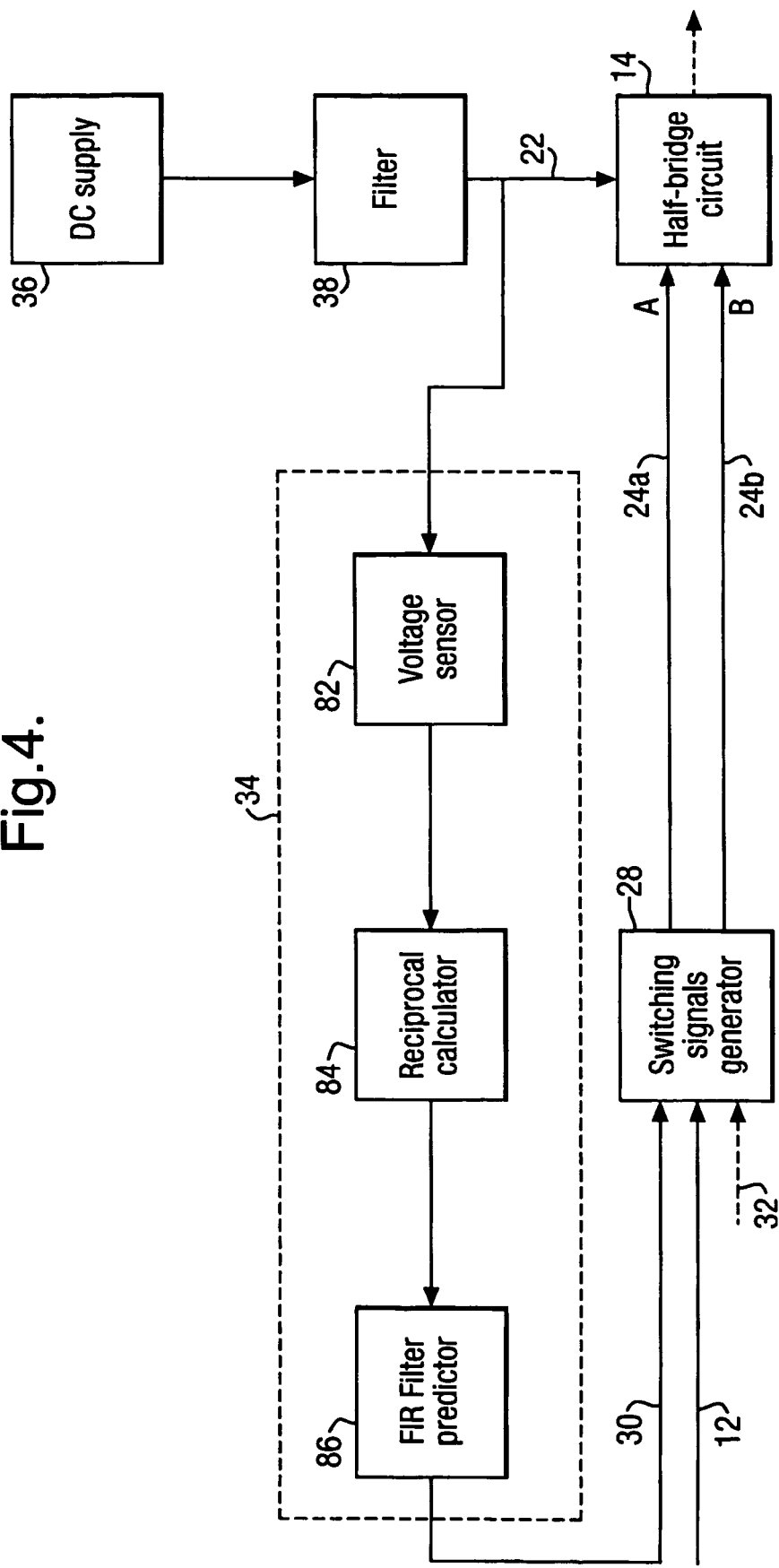
FIG. 4 is a schematic representation of the voltage sensor system 34 of FIG. 2.

The voltage sensor system 34 will now be described in more detail with particular reference to FIG. 4. As mentioned above, the supply input to the half-bridge circuit 14 is supplied with a filtered DC supply 22. This is obtained from a DC supply 36 that is passed through a filter 38 to remove as much mains ripple as possible that may be present in the signal from the DC supply 36.

In addition, there will be some intermodulation of the filtered DC supply 22 due to variations in the potential across the reservoir capacitor 26 in the half-bridge circuit 14 as it charges and discharges in response to variations in current flowing through the electromagnet 10. The intermodulation will manifest themselves as an amplitude modulation in the quantised voltage pulses seen by the electromagnet 10. Clearly, deviation from the desired $+V_S$, 0V or $-V_S$ pulse levels will lead to the voltage demand signal 12 not being met and the current flowing through the magnet will drift from that necessary to create the intended magnetic fields (e.g. to isolate vibrations in the moving machinery).

To compensate for unwanted fluctuations in the filtered DC supply 22, a predictive voltage sensor system 34 is used. Signal-processing delays mean that direct feedthrough of fluctuations in the filtered DC supply 22 would arrive at the switching signals generator 28 too late to provide effective compensation. Hence, a the feedforward predictive voltage sensor system 34 is used. A voltage sensor 82 measures the filtered DC supply 22 as shown in FIG. 4. The reciprocal of these measurements is calculated at 84 for use by a 7-tap finite impulse response (FIR) filter 86. These components are readily available as will be appreciated by those skilled in the art. The FIR filter 86 is used to predict the likely value of $1/V_S$ across the next period and passes this value as the voltage sensor signal 30 to the switching signals generator 28 such that weight can be added or subtracted to the voltage pulse width 44 proportionate to an expected increase or decrease in voltage respectively.

The quality of control of the electromagnet 10 is also affected by the finite and non-trivial time taken for the voltage seen by the electromagnet 10 to fall upon switching off of one of the transistors 20a, 20b (among other factors, as will be explained below). The linear decay of the voltage is caused because the voltage can only fall as fast as the current can discharge the capacitance inherent in the electromagnet 10. The current is measured by the current sensor 40, shown in FIG. 2, and the resulting current sensor signal 32 is passed to the switching signal generator 28 so that the switching signals pulse widths 52 can be calculated to compensate for the slow decay in voltage corresponding to the current measured in the previous period.

Now that the components of the current controller have been described, there follows a presentation of the method of operation of the current controller with particular attention being paid to how the widths of the pulses in the voltage seen by the electromagnet 10 and the pulses in the switching signals 24a, 24b are determined.

Each period begins with a voltage demand 12 being received by the switching signals generator 28 that, in turn, calculates the required switching signals 24a, 24b that will produce an average voltage across the electromagnet 10 for the period to match the voltage demand 12. The switching signals generator 28 then passes the switching signals 24a, 24b to the transistors 20a, 20b respectively, correctly synchronised to the period by reference to a precision timing clock 66.

As can best be seen from FIG. 3a, the voltage demand 12 is received by the voltage pulse width generator 42. As mentioned above, the voltage pulse width 44 in seconds is generated assuming that a single pulse of either $+V_S$ or $-V_S$ relative to a baseline of 0V will be used. The voltage pulse width 44 is generated with regard to fluctuations in the filtered DC supply 22, according to a predictive measure of $V_S$ for the period which is supplied as the voltage sensor signal 30 which can be written as $(1/V_S)_{est}$.

Furthermore, account is also taken of the forward voltage drop of the diodes 16 ($V_{diode}$) and the transistors 20a, 20b. If these effects were not accounted for, an output voltage offset and change in output voltage amplitude would be seen. The voltage drop across the transistors 20a, 20b is known to vary significantly over typical operating conditions. To estimate the size of the voltage drop, a value of the transistors' 20a, 20b drain-source resistance ($R_{DS}$) is obtained from the corresponding device data sheet for a representative operating point. This resistance is used in conjunction with the current sensor signal 32 (which gives the current $I_{mag}$ flowing through the electromagnet 10) to estimate the forward voltage drop of the transistors 20a, 20b. The value of $V_{diode}$ is assumed to be constant across the operating conditions of the current controller and so is obtained by choosing a value representative of a typical operating point from the corresponding device data sheet.

Finally, a small DC offset voltage correction ($V_{offset}$) is used for fine adjustment of the output voltage: this value is obtained by calibration.

The demanded voltage 12 ($V_{demand}$) is adjusted by the addition of the voltage drops in the diodes 16 and transistors 20a, 20b and the offset voltage correction, to compensate for those losses (use of positive and negative signs for the offset ensure correct compensation). The required voltage pulse width 44 ($W_{req}$) can hence be calculated from:

$$W_{req} = (V_{demand} + V_{diode} + I_{mag} \cdot R_{DS} + V_{offset}) \cdot \left(\frac{1}{V_S}\right)_{est} \cdot W_{full} \quad \text{equation (1)}$$

where $W_{full}$ is the maximum pulse width in seconds. In this example, a pulse repetition frequency of 64 kHz was used and the frequency of the timing clock was 32.768 MHz giving a period width of 15.625 µs. Of course, other pulse repetition frequencies can be substituted depending on noise demands and expense or availability of components to cope with higher frequencies.

It will be noted from equation (1) that the voltage pulse width 44 will carry a sign reflecting the polarity of the voltage demanded, i.e. it will be positive for voltage demands 12 in the range 0V to $+V_S$ and negative for voltage demands 12 in the range 0V to $-V_S$. This sign is carried throughout the subsequent calculations. Furthermore, the voltage pulse width 44 is a measure of the time away from the 0V base line and hence is the width of the pulse at $+V_S$ and the pulse at $-V_S$.

Whilst equation (1) leads to a high level of accuracy, not all or any of the terms contained in the first set of brackets (other than $V_{demand}$) need be included where a reduction in the performance of the electromagnet 10 can be tolerated.

The voltage pulse width 44 is then passed to the noise shaper system 46 to produce a noise-shaped voltage pulse width 48 ($W_{sh}$). This is calculated with reference to the quantisation error in the width of the previous period's pulse ($W_{QE-1}$) and also with reference to the quantisation error in the width of the last-but-one period's pulse ($W_{QE-2}$) as mentioned above. The noise-shaped voltage pulse width 48 is given by:

$$W_{sh} = W_{req} - 2\cos\left(\frac{2\pi \cdot f_{notch}}{f_{PRF}}\right) \cdot W_{QE-1} + W_{QE-2}$$

where $f_{PRF}$ is the pulse repetition frequency (64 kHz, as mentioned above) and where $f_{notch}$ is the chosen frequency for the inevitable notch in the noise spectrum of the shaped noise. In the present embodiment, this was chosen to be 1 kHz.

The noise-shaped voltage pulse width 48 is then passed to the switching signals pulse width generator 50 that generates the corresponding widths for the pulses in the switching signals 24a, 24b. However, there are four modes of switching the transistors 20a, 20b and the correct mode must be implemented. Accordingly, these four modes are now detailed with reference to FIGS. 5a-d. To summarise what has been discussed previously in this respect, the following voltages are seen by the electromagnet 10 when the transistors 20a, 20b are switched as follows:

| transistor states | voltage |
| --- | --- |
| both on | +$V_S$ |
| one on, one off | 0 V |
| both off | -$V_S$ |

Figure 5A:
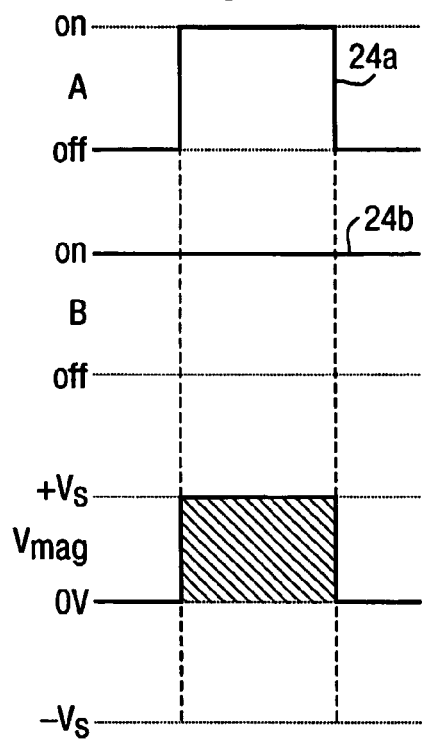
FIGS. 5a-d shows, for a single period only, switching signals 24a, 24b for the transistors 20a, 20b as provided at points A and B of FIG. 1 for four different switching modes and the resultant voltage (labelled as $V_{mag}$ for brevity) seen by the electromagnet 10.

FIG. 5a shows the switching sequence where the voltage demand 12 is for a positive voltage, i.e. in the range of 0 to +$V_S$. To avoid the power losses inherent in each switching operation of either transistor 20a, 20b, the default switching mode is a so-called 'class B' mode where only one transistor 20a is switched during a period whilst the other transistor 20b is left in its on state throughout the period. In this way, no power is lost in transistor 20b due to switching. In addition, in many types of application the voltage demand 12 is likely to remain positive or negative for many successive periods so that one transistor 20a, 20b can be left in a steady state over those periods thereby avoiding any power loss inherent in switching that transistor 20a, 20b. As can be seen, a single pulse in switching signal 24a is generated centrally within the period to provide a voltage across the electromagnet 10 with a single corresponding pulse of +$V_S$ (hatched in FIG. 5a) rising from a baseline of 0V to give the demanded positive voltage.

Figure 5B:
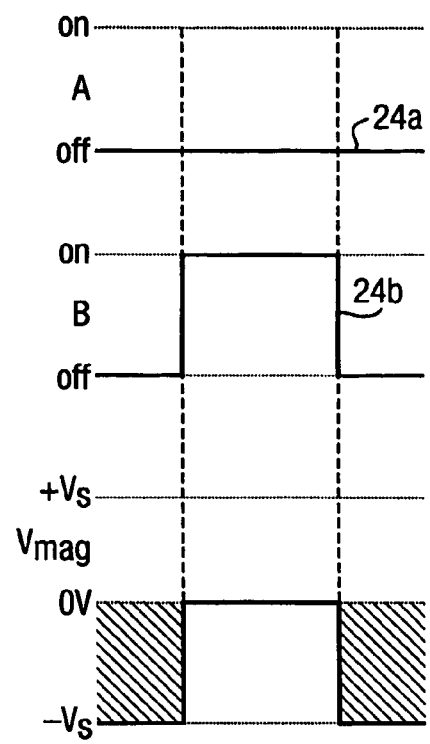

FIG. 5b shows a second mode of operation corresponding to a voltage demand 12 for a negative voltage, i.e. in the range of 0 to -$V_S$. Again, class B switching of the transistors 20a, 20b is used, this time with transistor 20a being left in an off state throughout the period and transistor 20b being switched with its switching signal 24b having a central pulse within the period. The resulting voltage seen by the electromagnet 10 has a pair of -$V_S$ pulses extending from the 0V baseline at the beginning and end of the period. Hence, the two pulses hatched in FIG. 5b combine to form the required negative voltage pulse. Therefore it is not the central pulse of switching signal 20b that gives the -$V_S$ pulse, but rather the peripheral regions. Accordingly, it is the full width of the period less the width of the central pulse in the switching signal 24b that corresponds to the width of the -$V_S$ pulse in the voltage seen by the electromagnet 10. It will be appreciated that, as above, a transistor (20a in this case) can be left in a steady state where successive negative voltages are demanded.

Strictly speaking, a further mode ought to be mentioned for the sake of completeness, namely that arising when a zero voltage is demanded. This can be implemented by leaving transistors 20a off and 20b on throughout the period.

Whilst class B switching is preferred due to the reduction in power losses in having to switch both transistors 20a and 20b within a period, a conflicting demand arises where small positive or small negative voltages are demanded. In the case of a small positive voltage, this leads to a narrow pulse in the voltage seen by the electromagnet 10 such that the voltage must rapidly step up to +$V_S$ then down to 0V. In the case of a small negative voltage, the problem lies in the start and end of successive periods where the voltage must rapidly step down to -$V_S$ then up to 0V. Slow response of the transistors 20a, 20b and ringing adds distortion to the square edges of the pulses leading to a lack of voltage control. These effects become problematic for a characteristic small pulse width where the steady flat region between ringing waveforms is lost. This leads to a loss of linearity in the current controller. To overcome this problem, a threshold pulse width $W_{thresh}$ is set and when a pulse width below this is required to meet a voltage demand 12, switching changes to so-called 'class AB' mode where both transistors 20a, 20b are switched in a period.

Figure 5C:
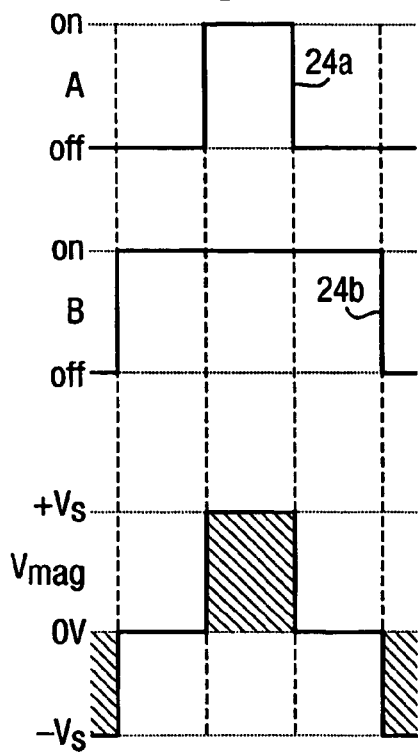

FIG. 5c shows a case of class AB switching for a small positive voltage demand 12. If implemented using class B switching, a single pulse in the voltage seen by the electromagnet 10 would arise that is below the threshold width. To avoid this, the transistor 20a is switched to produce a central on pulse with the a width equal to the threshold width plus the demanded width and, rather than leaving the transistor 20b in its on state throughout the period, it is switched to produce a central on pulse occupying most of the period. The resulting potential seen by the electromagnet 10 starts and ends with small downwardly-extending pulses at -$V_S$ where both transistors 20a, 20b are off (indicated by the unbroken hatched areas) which steps to regions at 0V where transistor 20b is on and transistor 20a is off, these regions meeting at a central pulse at +$V_S$ where both transistors 20a, 20b are on (indicated by the broken hatched area). The widths of the hatched areas have been exaggerated for the sake of clarity and should not be used to gauge actual threshold widths. The average potential seen by the electromagnet 10 over the period corresponds to the broken hatched area less the unbroken hatched areas which clearly results in a net small positive voltage.

Figure 5D:
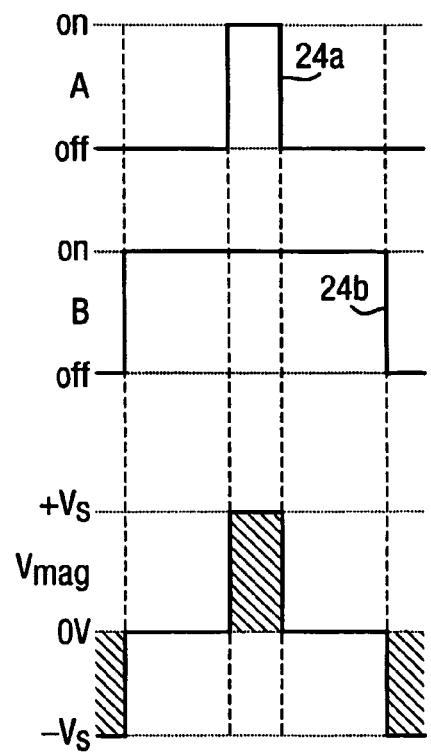

In a similar vein, FIG. 5d shows the case of class AB switching in response to a small negative voltage demand 12 that, if class B switching were to be used, would result in a width of the -$V_S$ pulse between successive periods that is below the threshold width. To maintain the minimum -$V_S$ pulse width, transistor 20b is switched to have an on pulse extending centrally over most of the period. Transistor 20a, rather than being left in an off state as in class B switching, is switched to have a central on pulse. The resulting potential seen by the electromagnet 10 has a shape corresponding to that described above with reference to FIG. 5c, except that now the unbroken hatched areas corresponding to -$V_S$ combine to be larger than the broken hatched area corresponding to +$V_S$, hence resulting in the electromagnet 10 seeing a small negative average potential.

Accordingly, the type of switching mode is determined by testing the following conditions:

$$W_{sh} \geq 0 \quad \text{condition (1)}$$

$$|W_{sh}| - W_{cap} \geq W_{thresh} \quad \text{condition (2)}$$

where $W_{cap}$ is a width adjustment calculated to compensate for capacitance in the electromagnet 10 ($C_{mag}$). This capacitance causes slow rise and fall times between the voltage levels seen by the electromagnet 10, as mentioned above, and so has the effect of artificially lengthening the pulses. Hence, control is lost. The width adjustment is calculated from:

$$W_{cap} = \frac{C_{mag}}{2\text{MAX}\{I_{mag}, I_{min}\}}$$

where the largest of the current through the electromagnet 10 ($I_{mag}$) or a minimum current value ($I_{min}$) is used. The minimum current value corresponds to a lower limit of current used in this calculation to avoid dividing by zero and other problems encountered where only small currents flow through the electromagnet 10.

The type of switching appropriate for the outcome of testing conditions (1) and (2) is presented below:

| condition (1) | condition (2) | switching mode | illustrated in |
|---|---|---|---|
| yes | yes | +class B | FIG. 5a |
| no | yes | −class B | FIG. 5b |
| yes | no | +class AB | FIG. 5c |
| no | no | −class AB | FIG. 5d |

The switching signal pulse widths 52 are then calculated for the appropriate switching modes as follows. In the equations below, $W_A$ and $W_B$ are the widths of the pulses of switching signals 24a and 24b respectively. $W_{EA}$ and $W_{EB}$ are the net effective errors in the actual width of the pulses generated in response to the switching signals 24a and 24b respectively (the values are determined through calibration). $W_{min}$ is a fixed offset to be added or subtracted when in class AB mode.

+Class B $$W_A = |W_{sh}| - W_{cap} - W_{EA}$$

$$W_B = W_{full}$$

i.e. transistor 20a has a pulse of the noise shaped voltage pulse width 48 less compensation for capacitance and net effective errors, whilst transistor 20b remains on throughout the period.

−Class B $$W_A = 0$$

$$W_B = W_{full} - |W_{sh}| W_{cap} - W_{EB}$$

i.e. transistor 20a remains off throughout the period, whilst transistor 20b has a central pulse equal to the full period width less the noise shaped voltage pulse width 48 (remembering that the noise shaped voltage pulse width 48 reflects the voltage pulse width at $-V_S$ whereas we are now setting a width for a pulse in the switching signal generating the central region at 0V) and also less compensation for capacitance and net effective errors.

+Class AB $$W_A = |W_{sh}| + (W_{min} + W_{cap}) - W_{cap} - W_{EA}$$

$$W_B = W_{full} - (W_{min} + W_{cap}) - W_{cap} - W_{EB}$$

i.e. transistor 20a has a pulse of the noise shaped voltage pulse width 48 plus the fixed offset to ensure the threshold width is exceeded less compensation for capacitance and net effective errors, whilst transistor 20b remains on throughout the period less the fixed offset to ensure no net gain in output voltage across the electromagnet 10 and less compensation for capacitance and net effective errors.

−Class AB $$W_A = (W_{min} + W_{cap}) - W_{cap} - W_{EA}$$

$$W_B = W_{full} - |W_{sh}| - (W_{min} + W_{cap}) - W_{cap} - W_{EB}$$

i.e. similar to the case of −class B switching, but now transistor 20a contains a pulse with the fixed offset width less compensation for capacitance and net effective errors, whilst transistor 20b has a reduction in width in its central pulse corresponding to the fixed offset to ensure a minimum gap between voltage changes between periods.

The switching signals pulse widths 52 have now been calculated, but these widths 52 are in seconds and can take any value in the range of 0 s to the full width of the period (the reciprocal of the pulse repetition frequency, i.e. 15.625 μs). However, as the final switching signals are pulse width modulated, the switching signals pulse widths 52 must be converted to cycle counts of the precision timing clock 66 such that they are quantised to match the number of available cycle counts in one period (it has been noted above that the combination of pulse repetition frequency and precision timing clock 66 frequency $f_{clock}$ gives 512 cycle counts per period). This function is performed by the switching signals pulse width quantiser 54.

The switching signals pulse width quantiser 54 calculates the number of cycle counts ($N_A$ and $N_B$ for transistors 20a and 20b respectively) from the simple formulae below and passes these values on as the quantised switching signals pulse widths 56.

$$N_A = |\text{round}(f_{clock} \cdot W_A)|$$

$$N_B = |\text{round}(f_{clock} \cdot W_B)|$$

$N_A$ and $N_B$ are also used to calculate the quantisation error 74 ($W_{QE}$) according to the formula:

$$W_{QE} = \left(\frac{N_A}{f_{clock}} - W_A\right) + \left(\frac{N_B}{f_{clock}} - W_B\right)$$

$W_{QE}$ is then used as $W_{QE\text{-}1}$ and $W_{QE\text{-}2}$ in following periods, as described above.

With the quantised switching signals pulse widths 56 known in units of cycle counts of the precision timing clock 66, the switching signals edge position generator 60 generates the precise cycle counts where the edges of the pulses of the switching signals 24a, 24b will occur.

The pulses are positioned using alternate-odd-asymmetry in order to minimise signal distortion. This distortion arises from where pulses of an odd number of cycle counts are needed. Such pulses cannot be positioned centrally within the period given the constraint that the edges must coincide with the start and end of cycle counts. If the pulses were always positioned to be half a cycle early or half a cycle late, distortion would result. This distortion is minimised by using alternate odd asymmetry, i.e. by alternating the offset between the leading and trailing edge halves of the period. Put into algorithms, the on edge position and off edge positions for transistor 20a are given by:

| if $N_A$ is even | then: | $ON_A = \frac{1}{2}(N_{full} - N_A)$ |
|---|---|---|
| | else: | $ON_A = \frac{1}{2}(N_{full} - N_A + d_A)$ and $d_A = -d_A$ |
| and: | | $OFF_A = ON_A + N_A$ | where $N_{full}$ is the maximum number of cycle counts (512) and $d_A$ is initially set to +1 and its value is carried through from one period to the next. As will be appreciated, the edge positions for transistor 20b are determined in corresponding fashion (i.e. with the 'A' subscripts swapped for 'B' subscripts).

With the edge positions of the pulses in the switching signals 24a, 24b known, these values are passed to the switching signals generator 64 as the switching signals edge positions 62. The switching signals generator 64 then synchronises the switching signals edge positions 62 to the cycle counts of the precision timing clock 66 to produce the actual switching signals 24a, 24b which are then passed to the transistors 20a, 20b respectively.

Hence, the half-bridge circuit 14 is operated to produce an average voltage across the electromagnet 10 corresponding to the voltage demand 12.

The person skilled in the art will appreciate that modifications can be made to the embodiments described hereinabove without departing from the scope of the invention.

For example, the above embodiment describes a current controller that supplies current to the electromagnet 10 in response to a voltage demand signal 12 that may be generated in accordance with a desired force by a global controller. However, the current controller may operate in response to a current demand signal 88 rather than a voltage demand signal 12. This signal may be generated by the global controller in much the same way as described with respect to generation of the voltage demand signal 12 of the first embodiment.

Figure 6:
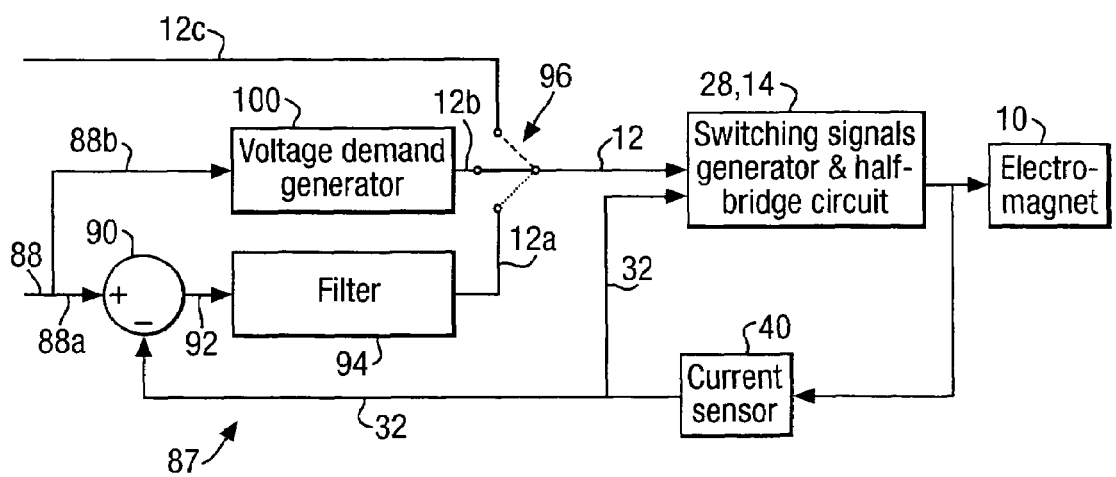
FIG. 6 is a schematic representation of part of a second embodiment of a current controller that can be operated in either voltage demand or current demand mode.

Such an arrangement is shown in FIG. 6: this Figure is equivalent to FIG. 2 but shows the additional elements required to operate in a current demand mode. Whilst all elements from FIG. 2 (and those shown in detail in FIGS. 3 and 4) would be included in the current controller, only those relevant to this discussion of the current demand mode are shown in FIG. 6 for the sake of clarity. As will be evident, the major change is the inclusion of a control loop indicated generally at 87.

In one mode of operation, current demand signal 88 (labelled as 88a for the sake of clarity) is compared with the current sensor signal 32 at a comparator 90. The current sensor signal 32 is derived from the output of the current sensor 40 and provides a measure of the current passing through the electromagnet 10. Comparing the current sensor signal 32 with the current demand signal 88a provides an error signal 92 that represents deviation in current through the electromagnet 10 away from the demanded current. The error signal 92 is passed to a filter 94 that incorporates control loop gain, a control loop filter and a current-to-voltage transfer model to produce voltage demand signal 12a. The voltage demand signal 12a is passed to the switching signals generator system 28 via a three-way switch 96.

Inaccuracies in the current-to-voltage transfer model are compensated by the control loop 87 using the current sensor 40. The performance of the current controller is dependent more on the noise performance and accuracy of the current sensor 40 than the accuracy of the current-to-voltage transfer model. If necessary, a combination of current sensors may be used, to give the best dynamic range for example.

In an alternative mode of operation where the control loop 87 that compensates for drifts in electromagnet current (via current sensor signal 32) is not required, the current demand signal 88 can be passed directly at 88b to a voltage demand generator 100, as shown in FIG. 6. The voltage demand generator 100 generates the voltage demand signal 12b by using a filter containing a model of the electromagnet load characteristic so that the voltage demand generator 100 can predict the appropriate voltage demand necessary to produce the required current demand 88. The voltage demand signal 12b is passed to the switching signals generator system 28 via a three-way switch 96. Of course, the accuracy of the eventual current passed to the electromagnet 10 is heavily dependent upon the accuracy of the load model generating the voltage demand signal 12b.

If desired, the current controller can be adapted to operate in either voltage demand or current demand mode. For example, the three-way switch 96 could be used to switch between the voltage demand input 12a provided by the filter 94 or the voltage demand input 12b provided by the voltage demand generator 100 or a direct voltage demand input 12c (i.e. a line carrying a voltage demand direct from a global controller or similar) to produce the voltage demand signal 12 passed to the switching signals generator system 28.

The invention claimed is:

1. A method of generating first and second switching signals for switching first and second switches of a switching circuit that further comprises an output and that receives a DC supply of nominal voltage $+V_S$, and wherein switching between various combinations of on and off states of the first and second switches produces a voltage at the output with pulses at levels of $+V_S$, 0V and $-V_S$;

the method comprising the steps of:
(a) receiving a voltage demand signal indicative of a desired voltage to be supplied at the cutout in a period; and
(b) generating the first and second switching signals, wherein at least one of the first and second switching signals comprises a single pulse of a determined width within the period, wherein the determined width does not fall below a minimum pulse width, and further, wherein successive transitions between on and off states of the first switching signal or of the second switching signal that occur in different periods are separated in time by a minimum time interval, and wherein the determined width is such that the combination of the first and second switching signals when applied to the first and second switches respectively produce an average voltage at the output for the period that is substantially equal to the desired voltage in the period, wherein, at step b), the first switching signal comprises a single pulse of a first determined width within the period and the second switching signal comprises a single pulse of a second determined width within the period, wherein neither said first nor said second determined width falls below said minimum pulse width and wherein said first and second determined widths are such that the combination of the first and second switching signals when applied to the first and second switches respectively produce an average voltage at the output for the period that is substantially equal to the desired voltage, further comprising the step of increasing the first determined width by an amount that is equal in magnitude to the second determined width but compensatory in effect in that a voltage pulse at the output of $+V_S$ or $-V_S$ resulting from the pulse in the second switching signal is balanced by an equal width of voltage pulse at the output of $-V_S$ or $+V_S$ respectively resulting from the increased first determined width of the first switching signal.

2. The method of claim 1, further comprising the step of generating the first and second switching signals according to a rule that the leading and trailing edges of the first switching signal do not coincide with either the leading or trailing edge of the second switching signal.

3. A method of generating first and second switching signals for switching first and second switches of a switching circuit that further comprises an output and that receives a DC supply of nominal voltage $+V_S$, and wherein switching between various combinations of on and off states of the first and second switches produces a voltage at the output with pulses at levels of $+V_S$, 0V and $-V_S$;

the method comprising the steps of:
(a) receiving a voltage demand signal indicative of a desired voltage to be supplied at the output in a period; and
(b) generating the first and second switching signals, wherein at least one of the first and second switching signals comprises a single pulse of a determined width within the period, wherein the determined width does not fall below a minimum pulse width, and further, wherein successive transitions between on and off states of the first switching signal or of the second switching signal that occur in different periods are separated in time by a minimum time interval, and wherein the determined width is such that the combination of the first and second switching signals when applied to the first and second switches respectively produce an average voltage at the output for the period that is substantially equal to the desired voltage in the period, further comprising the step of generating the first and second switching signals according to a rule that any pulse should be positioned symmetrically about the centre of the period.

4. A method of generating first and second switching signals for switching first and second switches of a switching circuit that further comprises an output and that receives a DC supply of nominal voltage $+V_S$, and wherein switching between various combinations of on and off states of the first and second switches produces a voltage at the output with pulses at levels of $+V_S$, 0V and $-V_S$;
the method comprising the steps of:
(a) receiving a voltage demand signal indicative of a desired voltage to be supplied at the output in a period; and
(b) generating the first and second switching signals, wherein at least one of the first and second switching signals comprises a single pulse of a determined width within the period, wherein the determined width does not fall below a minimum pulse width, and further, wherein successive transitions between on and off states of the first switching signal or of the second switching signal tat occur in different periods are separated in time by a minimum time interval, and wherein the determined width is such that the combination of the first and second switching signals when applied to the first and second switches respectively produce an average voltage at the output for the period tat is substantially equal to the desired voltage in the period, further comprising the step of generating the first and second switching signals according to the rule tat where pulses cannot be centred symmetrically, the longer and shorter sides of the asymmetric pulses are alternated between the leading edge side and the trailing edge side for successive asymmetric pulses.

5. A method of generating first and second switching signals for switching first and second switches of a switching circuit tat further comprises an output and that receives a DC supply of nominal voltage $+V_S$, and wherein switching between various combinations of on and off states of the first and second switches produces a voltage at the output with pulses at levels of $+V_S$, 0V and $-V_S$;
the method comprising the steps of:
(a) receiving a voltage demand signal indicative of a desired voltage to be supplied at the output in a period; and
(b) generating the first and second switching signals, wherein at least one of the first and second switching signals comprises a single pulse of a determined width within the period, wherein the determined width does not fall below a minimum pulse width, and further, wherein successive transitions between on and off states of the first switching signal or of the second switching signal that occur in different periods are separated in time by a minimum time interval, and wherein the determined width is such tat the combination of the first and second switching signals when applied to the first and second switches respectively produce an average voltage at the output for the period that is substantially equal to the desired voltage in the period, further comprising the step of noise shaping the first and second switching signals.

6. A method of operating a switching circuit comprising a bridge circuit having an input that receives a DC supply of nominal voltage $+V_S$ an output and first and second arms having first and second switches respectively, the first and second arms being connected to opposed ends of the output, the method comprising the steps of:
(a) generating pulsed first and/or second switching signals, wherein at least one of the first and second switching signals comprises a single pulse of a determined width within the period, wherein the determined width does not fall below a minimum pulse width, and further, wherein successive transitions between on and off states of the first switching signal or of the second switching signal that occur in different periods ate separated in time by a minimum time interval, and wherein the determined width is such tat die combination of the first and second switching signals when applied to the first and second switches respectively produce an average voltage at the output for the period tat is substantially equal to the desired voltage in the period; and
(b) supplying the first and second switching signals to the first and second switches respectively thereby to cause the first and second switches to switch between on and off states, switching between various combinations of on and off states producing an electrical signal across the output with voltage pulses at levels of $+V_S$, 0V and $-V_S$ and with an average voltage for the period substantially equal to the desired voltage, wherein either the first or second determined pulse width is generated with reference to a voltage signal indicative of the DC supply voltage such that the determined pulse width compensates for fluctuations in the DC supply.

7. The method of claim 6, wherein the voltage signal is passed through a filter to obtain a predictive measure of fluctuations in the DC supply.

8. The method of claim 7, wherein the voltage signal is passed through a finite impulse response filter.

9. A method of operating a switching circuit comprising a bridge circuit having an input that receives a DC supply of nominal voltage $+V_S$ an output and first and second arms having first and second switches respectively, the first and second arms being connected to opposed ends of the output, the method comprising the steps of:
(a) generating pulsed first and/or second switching signals, wherein at least one of the first and second switching signals comprises a single pulse of a determined width within the period, wherein the determined width does not fall below a minimum pulse width, and further, wherein successive transitions between on and off states of the first switching signal or of the second switching signal that occur in different periods are separated in time by a minimum time interval, and wherein the determined width is such that the combination of the first and second switching signals when applied to the first and second switches respectively produce an average voltage at the output for the period that is substantially equal to the desired voltage in the period; and (b) supplying the first and second switching signals to the first and second switches respectively thereby to cause the first and second switches to switch between on and off states, switching between various combinations of on and off states producing an electrical signal across the output with voltage pulses at levels of $+V_S$, 0V and $-V_S$ and with an average voltage for the period substantially equal to the desired voltage, wherein either the first or second determined pulse width is generated to include an adjustment to the width of the pulse to compensate far a voltage drop across a diode and/or transistor in the bridge circuit.

10. The method of claim 9, wherein the adjustment to the pulse width is calculated with reference to a current signal indicative of the current flowing through the output and to a representative resistance of the diode or transistor.

11. A method of operating a switching circuit comprising a bridge circuit having an input that receives a DC supply of nominal voltage $+V_S$ an output and first and second arms having first and second switches respectively, the first and second arms being connected to opposed ends of the output, the method comprising the steps of:

(a) generating pulsed first and/or second switching signals, wherein at least one of the first and second switching signals comprises a single pulse of a determined width within the period, wherein the determined width does not fall below a minimum pulse width, and further, wherein successive transitions between on and off states of the first switching signal or of the second switching signal that occur in different periods are separated in time by a minimum time interval, and wherein the determined width is such that the combination of the first and second switching signals when applied to the first and second switches respectively produce an average voltage at the output for the period that is substantially equal to the desired voltage in the period; and (b) supplying the first and second switching signals to the first and second switches respectively thereby to cause the first and second switches to switch between on and off states, switching between various combinations of on and off states producing an electrical signal across the output with voltage pulses at levels of $+V_S$, 0V and $-V_S$ and with an average voltage for the period substantially equal to the desired voltage, wherein a pulse of the first or second switching signals is generated to include an adjustment to the width of the pulse to compensate for a voltage offset caused by a slow response in generating the first or second switching signals.

12. The method of claim 6, wherein the first and second switches are transistors and the method comprises the step of switching the transistors between on and off states, the on and off states corresponding to substantially minimum voltage drop and substantially minimum current flow respectively through the transistors.

13. A method of generating first and second switching signals for switching first and second switches of a switching circuit that further comprises an output and that receives a DC supply of nominal voltage $+V_S$, and wherein switching between various combinations of on and off states of the first and second switches produces a voltage at the output with pulses at levels of $+V_S$, 0V and $-V_S$;

the method comprising the steps of:

(a) receiving a voltage demand signal indicative of a desired voltage to be supplied at the output in a period; and (b) generating the first and second switching signals, wherein at least one of the first and second switching signals comprises a single pulse of a determined width within the period, wherein the determined width does pot fall below a minimum pulse width, and further, wherein successive transitions between on and off states of the first switching signal or of the second switching signal that occur in different periods are separated in time by a minimum time interval, and wherein the determined width is such that the combination of the first and second switching signals when applied to the first and second switches respectively produce an average voltage at the output for the period that is substantially equal to the desired voltage in the period, further comprising the step of receiving a current demand signal indicative of a desired current to be supplied to the output in a period and calculating the voltage demand signal indicative of a desired voltage to be supplied to the output that results in an electrical signal being supplied to the output during the period with a current substantially equal to the desired current.

14. The method of claim 13, wherein the step of calculating the voltage demand signal is performed with reference to a model of the load characteristic of a load connected to the output.

15. The method of claim 13 further comprising the step of generating the voltage demand signal with reference to a current signal indicative of the current flowing Through the output.

16. A computer program product comprising a computer readable storage medium containing computer readable instructions that when executed implement a method of generating first and second switching signals for switching first and second switches of a switching circuit that further comprises an output and tat receives a DC supply of nominal voltage $+V_S$, and wherein switching between various combinations of on and off states of the first and second switches produces a voltage at the output with pulses at levels of $+V_S$, 0V and $-V_S$;

the method comprising the steps of:

(a) receiving a voltage demand signal indicative of a desired voltage to be supplied at the output in a period; and (b) generating the first and second switching signals, wherein at least one of the first and second switching signals comprises a single pulse of a determined width within the period, wherein the determined width does not fall below a minimum pulse width, and further, wherein successive transitions between on and off states of the first switching signal or of the second switching signal that occur in different periods are separated in time by a minimum time interval, and wherein the determined width is such that the combination of the first and second switching signals when applied to the first and second switches respectively produce an average voltage at the output for the period that is substantially equal to the desired voltage in the period.

17. A switching circuit operable to receive a DC supply of nominal voltage $+V_S$ and that comprises first and second switches, an output and a computer programmed to control the generation of switching signals for switching said first and second signals according to a method of generating first and second switching signals for switching first and second switches of a switching circuit that further comprises an output and that receives a DC supply of nominal voltage $+V_S$, and wherein switching between various combinations of on and off states of the first and second switches produces a voltage at the output with pulses at levels of $+V_S$, 0V and $-V_S$;

the method comprising the steps of:
(a) receiving a voltage demand signal indicative of a desired voltage to be supplied at the output in a period; and
(b) generating the first and second switching signals, wherein at least one of the first and second switching signals comprises a single pulse of a determined width within the period, wherein the determined width does not fall below a minimum pulse width, and further, wherein successive transitions between on and off states of the first switching signal or of the second switching signal that occur in different periods are separated in time by a minimum time interval, and wherein the determined width is such that the combination of the first and second switching signals when applied to the first and second switches respectively produce an average voltage at the output for the period that is substantially equal to the desired voltage in the period.

18. A switching circuit according to claim 17, further comprising a noise shaper operable to noise shape the first and second switching signals.

19. A switching circuit according to claim 17 comprising a bridge circuit including an input operable to receive a DC supply of nominal voltage $+V_S$, an output and first and second arms having first and second switches respectively, the first and second arms being connected to opposed ends of the output and a computer programmed to control the generation of switching signals for switching said first and second signals.

20. A switching circuit according to claim 19, wherein said bridge circuit comprising a voltage signal sensor operable to produce a voltage signal indicative of the DC supply voltage such that the determined pulse width compensates for fluctuations in the DC supply.

21. A switching circuit according to claim 20, wherein said bridge circuit further comprising a filter arranged to receive the voltage signal.

22. A bridge circuit according to claim 21, wherein the filter is a finite impulse response filter.

23. A method of generating first and second switching signals for switching first and second switches of a switching circuit that further comprises an output and that receives a DC supply of nominal voltage $+V_S$, and wherein switching between various combinations of on and off states of the first and second switches produces a voltage at the output with pulses at levels of $+V_S$, 0V and $-V_S$;

the method comprising the steps of:
(a) receiving a voltage demand signal indicative of a desired voltage to be supplied at the output in a period; and
(b) generating the first and second switching signals, wherein at least one of the first and second switching signals comprises a single pulse of a determined width within the period, wherein the determined width does not fail below a minimum pulse width, and further, wherein successive transitions between on and off states of the first switching signal or of the second switching signal that occur in different periods are separated in time by a minimum time interval, and wherein the determined width is such that the combination of the first and second switching signals when applied to the first and second switches respectively produce an average voltage at the output for the period that is substantially equal to the desired voltage in the period, wherein, at step b), the first switching signal comprises a pulse of the determined width within the period and the second switching signal remains in one state throughout the period.

* * * * *